United States Patent [19]

Okuyama et al.

[11] Patent Number: 4,852,958
[45] Date of Patent: Aug. 1, 1989

[54] OPTICAL MATRIX SWITCH HAVING OPTIMIZED CROSSTALK CHARACTERISTICS AND UNIFORM OPTICAL OUTPUT INTENSITY

[75] Inventors: Hideaki Okuyama; Shigehiro Kusumoto; Keisuke Watanabe; Kiyoshi Nagai, all of Tokyo, Japan

[73] Assignee: Oki Electric Industry Co., Ltd., Tokyo, Japan

[21] Appl. No.: 166,305

[22] Filed: Mar. 10, 1988

[30] Foreign Application Priority Data

Mar. 10, 1987 [JP] Japan .................................. 62-53072
Mar. 24, 1987 [JP] Japan .................................. 62-67836

[51] Int. Cl.$^4$ .......................... G02B 6/10; G02F 1/29
[52] U.S. Cl. .............................. 350/96.13; 350/96.15; 350/96.16
[58] Field of Search ............... 370/1, 4; 455/601, 600; 350/96.13, 96.15, 96.16

[56] References Cited

U.S. PATENT DOCUMENTS 4,787,692 11/1988 Spanke ....................... 350/96.13 X

OTHER PUBLICATIONS

IEEE Communications Magazine, May 1987-vol. 25, No. 5; "Architectures for Guided-Wave Optical Space Switching Systems"; Ron A. Spanke.
"Study on a Small-Capacity Optical Space-Division Switching System"; Shimoe et al.; Apr. 18, 1986; SE86-3.
2394 Laser Focus, 21(1985) Dec., No. 12, "Optical Switching; NTT's Program Emphrasizes Silica-Based Optical Integrated Circuits".
"Architectures for Large Nonblocking Optical Space Switches"; 8106 IEEE Journal of Quantum Electronics OE-22(1986) Jun., No. 6, New York, U.S.A., Ron A. Spanke.

Primary Examiner—John D. Lee
Assistant Examiner—John Ngo
Attorney, Agent, or Firm—Wenderoth, Lind & Ponack

[57] ABSTRACT

An optical matrix switch with $2^{i+1}$ input ports (where i is a natural number) and $2^{i+1}$ output ports, that performs a matrix selection on optical input signals received at the input ports and outputs them as optical output signals at the output ports, comprises: an i-stage input branching tree consisting of 1×2 branching means connected in a tree configuration, for dividing the optical input signals into $2^{(2i+1)}$ branched signals; a double tree including $2^{2i}$ 2×2 optical switches connected in series to the input branching tree so that each 2×2 optical switch receives two branched signals from different input ports and generates switch output signals at a selected one of its two outputs; and an i-stage output merging tree consisting of 2×1 merging means connected in a tree configuration for receiving the switch output signals from the 2×2 optical switches and generating optical output signals at the $2^{i+1}$ output ports. Dummy points of intersection are provided to equalize the number of points of intersection on any light propagation path from an input port to an output port.

6 Claims, 13 Drawing Sheets

OPTICAL MATRIX SWITCH HAVING OPTIMIZED CROSSTALK CHARACTERISTICS AND UNIFORM OPTICAL OUTPUT INTENSITY

BACKGROUND OF THE INVENTION

This invention relates to an optical matrix switch with a plurality of input and output ports that performs a matrix switching operation on optical input signals supplied to the input ports and generates optical output signals at the output ports.

With the introduction of optical fiber into carrier networks, there has recently been much study of the use of guided-wave optical switches in switching systems.

FIG. 1 is an oblique view showing the structure of an optical matrix switch using this type of guided-wave switch. Sixteen 2×2 optical switches 91 are arranged in a 4×4 square matrix array on a LiNbO3 substrate 9 having electro-optic properties. Each of the four input ports 1a, 1b, 1o, and 1d feeds into a row of 2×2 optical switches 91, one set of the inputs and outputs of which are connected in series via waveguides 93. The outputs of the last column of 2×2 optical switches gI are connected to the four output ports 2a, 2b, 2c, and 2d. The output of each 2×2 optical switch 91 that is not connected in series in its row is linked via a waveguide 93 to the input of a 2×2 optical switch 91 in the next column that is not connected in series in its row, creating diagonal interconnections among the 2×2 optical switches 91. In the prior art thus configured, information entering one of the input ports 1a, 2a, 3a, or 4a is switched by the 2×2 optical switches at the crosspoints of the matrix, each of which can be in either the cross or bar state. The number of optical switches in this configuration is the same as in the most elementary optical matrix switch, in which the optical switches are arranged in a square matrix and are connected orthogonally, but this configuration connects any given pair of input and output ports through a constant number of optical switch means and requires only half as many means as the most elementary optical matrix switch in the worst case, so it has the advantages of low loss and reduced crosstalk.

As indicated by the solid and dotted arrows in Fig. 2, however, this prior art configuration is not entirely free from crosstalk. Crosstalk occurs at the third 2×2 optical switch 91 in the fourth row when information entering at input port 1b and following the solid arrows meets information entering at input port 1d and following the dotted arrows.

FIG. 2 shows an oblique view of an improved type of optical matrix switch in which crosstalk does not occur. The improved switch comprises sixteen 2×2 optical switches 94 arranged in a 4×4 square matrix array connected to the input ports 1a, 1b, 1c, and 1d, and a similar array of 2×2 optical switches 95 connected to the output ports 2a 2b, 2c, and 2d. The 2×2 optical switches 94 and 95 at the crosspoints of the matrix arrays on the input and output sides are interconnected by waveguides 93 in a pattern that shifts one row lower in the output array for each successive column in the input array.

This arrangement enables the information entering the input ports to undergo matrix switching and be output at the output ports with almost no crosstalk at all, because the same 2×2 optical switch never receives differing input information.

Although the prior art as described above achieves much lower levels of crosstalk than an optical matrix switch comprising an elementary square array of 2×2 optical switches, it requires both a square array of optical switches on the input side matching the number of input ports, and a similar square array of optical switches on the input side. Since it therefore requires twice as many switches as an optical matrix switch with the elementary square array, the device is larger in size, and there is also a slight increases in the number of optical switch states on the route from the input port to the output port. Another problem with this configuration is that it does not provide a way to reduce light loss.

As a solution to these problems, the inventor has proposed an optical matrix switch that has excellent crosstalk characteristics and comprises approximately the same number of optical switches as an optical matrix switch with an elementary square matrix configuration, but that can be made small in size and has only a small number of optical switches on the route from a given input port to a given output port (Japanese Patent Application No. 267700/1986 filed Nov. 12, 1986). FIG. 3A and FIG. 3B show 4×4 and 8×8 configurations of this optical matrix switch. The configuration in FIG. 3A comprises input waveguides 1a through 1d, output waveguides 5a through 5d, 2×2 optical switches used in the 1×2 configuration (2a through 2d) and 2×1 configuration (4a through 4d), and 2 ×2 optical switches 3a through 3d. Circles represent optical switches; lines represent waveguides linking the switches. These optical switches and waveguides are fabricated on &he same substrate.

The configuration in FIG. 3B comprises input waveguides 1a through 1h, output waveguides 5a through 5h, 2×2 optical switches used in the 1×2 configuration $2_{1a}$ through $2_{1h}$, 2×2 optical switches used in the 2×1 configuration $4_{2a}$ through $4_{2h}$, and 4×4 optical switches 7a through 7d consisting of 2×2 optical switches structured as in FIG. 3A. The input Waveguides 1a through 1h and 1×2 optical switches $2_{1a}$ through $2_{1b}$ in FIG. 3B can be divided into two groups: those labeled with subscripts from a through d and those labeled with subscripts from e through h. The output 2×1 optical switches $4_{2a}$ through $4_{2h}$ and the output waveguides 5a through 5h can also be divided into two groups.

The input ports 1a through 1d are selectively connected by the input optical switches $2_{1a}$ through $2_{1d}$ to one of the 4×4 optical switches 7a and 7b connected to the two output port groups. Similarly, the input ports 1e through 1h are selectively connected by the input optical switches $2_{1e}$ through $2_{1h}$ to one of the 4×4 optical switches 7c 7 and 7d connected to the two output port groups. The output 2×1 optical switches 42a through 42h select one of the 4×4 optical switches 7a and 7b or 7c and 7d connected to the two groups of input ports 1a through 1d and 1e through 1h and connect them to the output ports. In a given group, the output port that is selected depends on the operation of the 4×4 optical switches 7a through 7d.

A major feature of this type of optical matrix switch is that it Is smaller than the square matrix type in general use.

A problem in the configuration described above is that light loss occurs at the points of intersection of the waveguides, degrading the crosstalk characteristics. Consider, for example, the light signal 41 traveling through the waveguide 7c-$4_{2a}$ in FIG. 3C. If the light signal 42 is present in the waveguide 7a-42b crosstalk will occur at the point of intersection 43 of the waveguides 41 and 42. Suppose that the amount of crosstalk into the waveguide 7a-42a at the point of intersection 43 is 20 dB with respect to the strength of the light signal 42, and that the loss at the points of intersection 44a through 44f and 43 is 2dB. If the light signals 41 and 42 had the same initial strength, immediately after passing the point of intersection 43 the light signal 42, since it has passed through points of intersection 44a through 44f as well as 43, has lost 14dB in strength. The amount of crosstalk therefore increases to 6dB with respect to the light signal 41.

SUMMARY OF THE INVENTION

An object of the present invention is to eliminate the defect described above and provide an optical matrix switch with improved crosstalk characteristics, which also can have a uniform optical output intensity.

To achieve the above object, this invention comprises: an input branching tree consisting of i stages of 1×2 branching means connected in a tree configuration, which receives optical input signals from $2^{i+1}$ input ports and divides them into $2^{(2i+1)}$ branched signals (where i is a natural number); $2^{2i}$ 2×2 optical switches that are connected in series to the input branching tree and form one stage of a double tree structure, each 2×2 optical switch receiving two branched signals from two different input ports and providing an output signal at a selected one of its two outputs; and an output merging tree consisting of i states of 2×1 branched signals connected in a tree configuration, which receive the switch output signals from the 2×2 optical switches and provide optical output signals to the $2^{i+1}$ output ports; wherein dummy intersection points are provided to equalize the number of interaction points on any light propagation path from an input port to an output port.

In this invention as described above, the optical input signals supplied to the $2^{i+1}$ input ports are divided by the i stages of 1×2 branching means of the input branching tree into $2^{(2i+1)}$ branched signals. Branched signals from two different input& ports are supplied to the two inputs of the $2^{2i}$ 2×2 optical switches that, with the input branching tree, form one state of a double tree. One of these two inputs is selected and directed to one of the two outputs as the switch output signal. The switch output signals become the inputs of an i-stage merging tree consisting of 2×1 merging means, which branch them into $2^{i+1}$ output signals which are supplied to the output ports.

Dummy points of intersection are provided to equalize the number of points of intersection on any light propagation path from an input port to an output port, so the intensity of the output light signal is the same regardless of the path taken by the light.

DETAILED DESCRIPTION OF THE EMBODIMENTS

Figure 4:
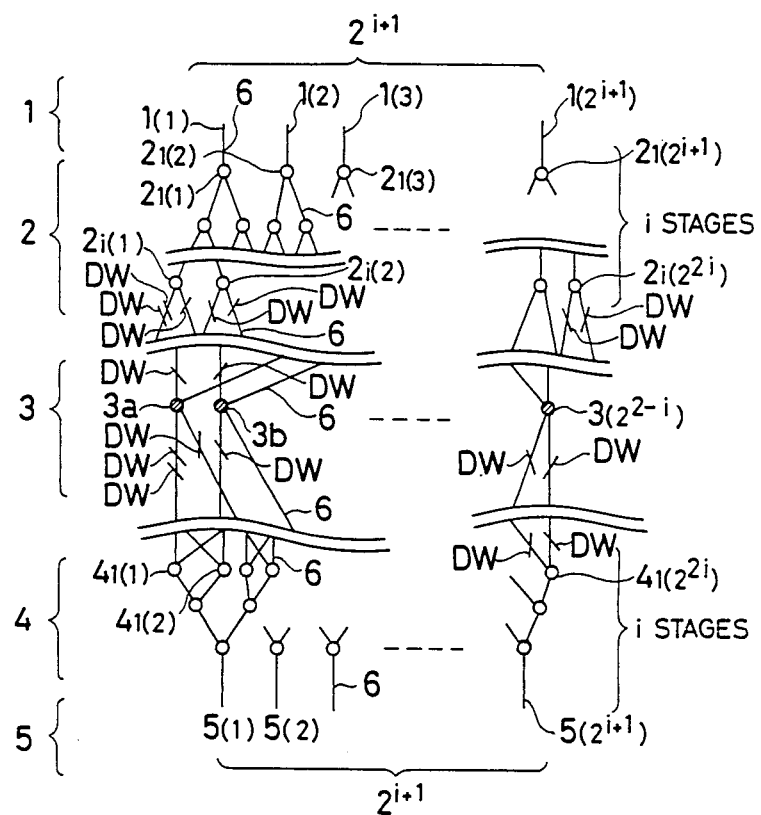
FIG. 4 is a schematic diagram of an embodiment of the present invention.

FIG. 4 is a functional schematic diagram of one embodiment of the present invention. Optical input signals enter at the $2^{i+1}$ input ports 1 (1 $_{(1)}$, 1$_{(2)}$, 1$_{(3)}$, . . . , 1 $_{2i+1}$), where i is a natural number). The input ports 1 are connected to an i-stage input branching tree 2 consisting of 1×2 branching means 2$_{1(1)}$, 2$_{1(2)}$, . . . , 2$_{i(1)}$, 2$_{i(2)}$, . . . , 2$_{i(22i)}$. From the i-th stage, comprising the 1×2 branching means 2$_{i(1)}$, 2$_{i(2)}$, . . . , 2$_{i(22i)}$, are obtained $2^{(2i+1)}$ branched signals. To the 1×2 branching means 2$_i$ the i-th stage there are also connected, as the i+1-th stage of the tree, $2^{2i}$ 2×2 optical switches 3 (3 $_{(1)}$, 3$_{(2)}$, . . . , 3$_{(22i)}$) Which, together with the input branching tree 2, form a compound tree. The two inputs of each of the $2^{2i}$ 2×2 optical switches 3 are connected so as to receive branched signals from different input ports. Each of the 2×2 optical switches 3 also has two outputs. The $2^{(2i+1)}$ outputs from the collection of all the 2×2 optical switches 3 are connected to the inputs of the $2^{2i}$ 2×1 merging means 4$_{1(1)}$, 4$_{1(2)}$, . . . , 4$_{1(22i)}$ in the first stage of an i-stage merging tree 4, and thence through the i-stage merging tree to the inputs of the i-th stage of 2×1 merging means 4$_{i(1)}$, 4$_i$(2), . . . , 4 $_{i(2i+1)}$. The outputs of the merging means 4$_i$ in the i-th state are connected to $2^{i+1}$ output ports 5 (5 $_{(1)}$, 5$_{(2)}$, . . . , 5$_{(2i+1)}$). The interconnections among the input ports 1, the input branching tree 2. The 2×2 optical switches 3. The merging tree 4, and the output ports 5 consist of waveguides 6, and are configured so that the optical input signal applied to any input port (1a, say) can reach all of the output ports 5 (5 $_{(1)}$, 5$_{(2)}$, . . . , 5$_{(2i+1)}$) via the input branching tree 2, the 2×2 optical switches 3, and the merging tree 4.

Additional dummy waveguides marked Dw in the drawing are provided crossing the above waveguides at dummy points of intersection. These dummy points of intersection are placed so as to equalize the total number of points of intersection (the sum of the number of real points of inter-section and the number of dummy points of intersection) on any light propagation path from an input port to an output port.

The operation of this embodiment is explained next. The input optical signals received at the $2^{i+1}$ input ports 1 (1 $_{(1)}$, 1$_{(2)}$, . . . , 1 $_{(2i+1)}$) are divided into $2^{(2i+1)}$ branched signals by the i-state input branching tree 2 consisting of stages of 1×2 branching means (2$_{i(1)}$, 2$_{i(2)}$, ..., $2_{i(2^{2i})}$), and fed to the $2^{2i}$ 2×2 optical switches 3 ($3_{(1)}$, $3_{(2)}$, ..., $3_{(2^{2i})}$). Each 2×2 optical switch 3 receives at its two inputs branched signals from two different input ports, selects one of its two outputs, and outputs a switch output signal. The first stage of 2×1 merging means ($4_{1(1)}$, $4_{1(2)}$, ..., $4_{1(2^{2i})}$) connected to the outputs of the 2×2 optical switches 3 receives the switch output signals and merges them into outputs that are fed to the second state of 2×1 merging means ($4_{2(1)}$, $4_{2(2)}$, ..., $4_{2(2^{2i-1})}$). The merged signals continue to travel through the i-stage merging tree 4 unit they become the optical outputs from the i-th state of 2×1 merging means ($4_{i(1)}$, $4_{i(2)}$, ..., $4_{i(2i+1)}$) to the $2^{i+1}$ output ports 5.

Since dummy points of intersection are provided to equalize the total number of points of intersection on any light propagation path. The light obtained at the output ports is nearly uniform.

Figure 5A:
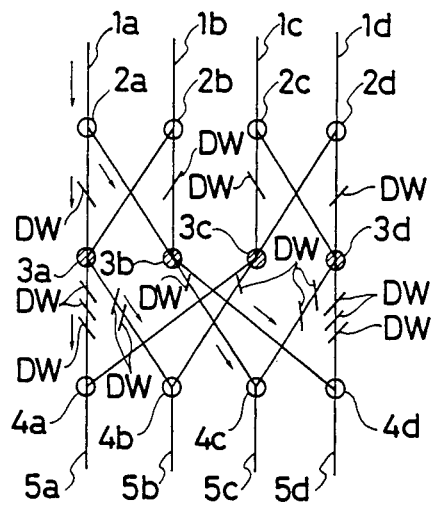
FIG. 5 A and 5B illustrate the schematic configuration of another embodiment of the present invention.
Figure 5B:
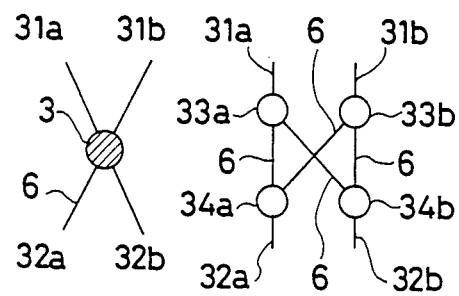

An embodiment of this invention applied to a 4×4 optical matrix switch will be described next with reference to FIGS. 5A and 5B. FIG. 5A is a schematic diagram of the embodiment; FIG. 8B shows the operation of the 2×2 optical switches in the double tree. The 4×4 optical matrix switch of this embodiment corresponds to the i=1 case of the $2_{i+1} \times 2^{i+1}$ optical matrix switch in FIG. 4. The optical input signals at the four input ports 1a, 1b, 1c, and 1d are connected through an input branching tree consisting of only one stage of 1×2 branching means 2a, 2b, 2c, and 2d to the eight inputs of the four 2×2 optical switches 3a, 3b, 3c, and 3d. The eight outputs of the 2×2 optical switches 3a, 3b, 3c, and 3d are connected through an output merging tree consisting of only one stage of 2×1 merging means 4a, 4b, 4c and 4d to the four output ports 5a, 5b, 5c, and 5d. The four 2×2 optical switches 3a, 3b, 3c, and 3d form the elements of a double tree, being at once the second stage of the tree structure with respect to the input branching tree and the pre-stage tree elements of the 2×1 merging means 4a, 4b, 4c, and 4d forming the output merging tree. The manner in which the outputs of the input branching tree and the inputs of the 2×2 optical switches, and the output of the 2×2 optical switches and the inputs of the output merging tree are connected via waveguides 6 is as follows. One output of the 1×2 branching means 2a and one output of the 1×2 branching means 2b in the input branching tree are connected to the inputs of the 2×2 optical switch 3a. The other outputs of the 1×2 branching means 2a and the other input of the 1×2 branching means 2b in the input branching tree are connected to the inputs of the 2×2 optical switch 3b. One output of the 1×2 branching means 2c and one output of the 1×2 branching means 2d are connected to the inputs of the 2×2 optical switch 3c. The other output of the 1×2 branching means 3c and the other output of the 1×2 branching means 2d in the input branching tree are connected to the inputs of the 2×2 optical switch 3d. The outputs of the 2×2 optical switch 3a are connected to one input of the 2×1 merging means 4a and one input of the 2×1 merging means 4b in the output merging tree. The outputs of the 2×2 optical switch 3b are connected to one input of the 2×1 merging means 4c and one input of the 2×1 merging means 4d. The outputs of the 2×2 optical switch 3c connected to the other input of the 2×1 merging means 4a and the other input of the 2×1 merging means 4b in the input branching tree. The outputs of the 2×2 optical switch 3d are connected to the other input of the 2×1 merging means 4c and the other input of the 2×1 merging means 4d.

Additional dummy waveguides marked DW in the drawing are provided, crossing the above waveguides at dummy points of intersection. These dummy points of intersection are placed so as to equalize the total number of points of intersection (the sum of the number of real points of intersection and the number of dummy points of intersection) on any light propagation path from an input port to an output port.

The operation of this embodiment is explained next. The optical input signals at the input ports 1a, 1b, 1c, and 1d are branched by the branching tree consisting of the 1×2 branching means 2a, 2b, 3c, and 3d and become the inputs to the 2×2 optical switches 3a, 3b, 3c, and 3d. The two inputs to each of the 2×2 optical switches 3a, 3b, 3c, and 3d are branched signals from different input ports 1a, 1b, 1c, and 1d. The switch output signals from the 2×2 optical switches 3a, 3b, 3c, and 3d are combined by the output merging tree and supplied as optical output signals to the output ports 5a, 5b, 5c, and 5d. The detailed operation of the 2×2 optical switches will be explained with reference to FIG. 5B. The 2×2 optical switch 3 has a pair of inputs 31a and 31b and a pair of outputs 32a and 32b, and operates in a way equivalent to the double tree in the right half of FIG. 5B by coupling an input to a selected output. Specifically, this double tree comprises a 1×2 optical switch 33a that branches the input 31a, two optical switches 34a and 34b that are connected in tree fashion, a 1×2 optical switch 33b that branches the input 31b, and optical switches 34a and 34b that receive and merge the outputs of the 1×2 optical switches 30a and 33b. The 2×2 optical switch in the left part of FIG. 5B is both a branching means that forms part of the branching tree and a merging means that forms part of the merging tree. For this reason the tree is referred to as a double tree.

The result is that the 4×4 optical matrix switch in FIG. 5A is equivalent to a so-called nonblocking 4×4 optical matrix switch that can direct an optical input signal at any of the input ports 1a, 1b, 1c, and 1d through the input branching tree, the 2×2 optical switches of the double tree, and the output merging tree to all of the output ports 5a, 5d, 5c, and 5d. The input branching tree and the output merging tree divide and combine information with almost no crosstalk. A slight increase in crosstalk occurs in the single stage of 2×2 optical switches 3a, 3b, 3c, and 3d in the double tree, because each optical switch replaces parts of both trees, but this arrangement achieves a simple, compact configuration.

Since dummy points of intersection with dummy waveguides are provided to equalize the total number of points of intersection on any light propagation path, the light signals obtained at the output ports are nearly uniform.

Figure 6:
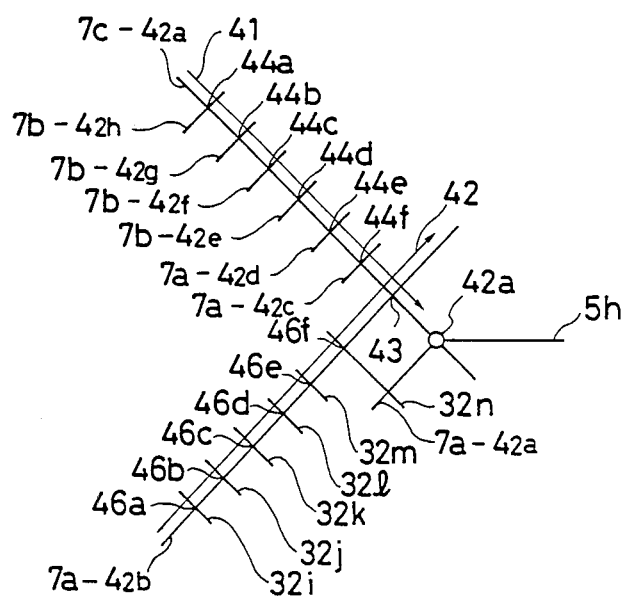
FIG. 6 shows the principle of operation of the embodiment of FIG. 6.

This will not be explained in more detail with reference to FIG. 6.

Consider the light signal 41 traveling through the waveguide 7c-$4_{2a}$. If a light signal 42 is also traveling through the waveguide 7a-$4_{2a}$, crosstalk occurs when the light signals 41 and 42 cross at the point of intersection 43. Suppose the amount of crosstalk into the waveguide 7a-$4_{2a}$ at the point of intersection 43 is 20dB with respect to the strength of the light signal 42, and that the loss at the points of intersection 44a through 44f is 2 dB. If the light signals 41 and 42 started with the same original strength, at the point where the light signal 41 has just passed through the point of intersection 43, since it has passed through the points of intersection 44a through 44f as well as 43, its strength is diminished by 14dB. When the light signal 42 reaches the point of intersection 43 it has passed through the points of intersection 46a through 46f, so its strength is diminished by 12dB. The amount of crosstalk is therefore 18dB with respect to the strength of the light signal 41, an improvement of 12dB over the example of the prior art shown in FIGS. 3A and 3B.

The discussion above concerns crosstalk characteristics at the points of intersection of the waveguides, but this invention also improves crosstalk in the optical switch elements. Crosstalk in the optical switch elements of this optical matrix switch arises mainly at the points 3a, 3b, 3c, and 3d in FIG. 5A. The greatest crosstalk occurs then these 2×2 optical switches receive light simultaneously at their two input ports.

Figure 1:
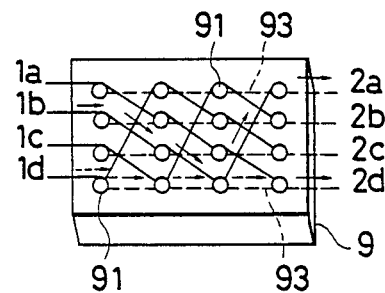
FIG. 1 and 2 show examples of prior art optical matrix switch.
Figure 2:
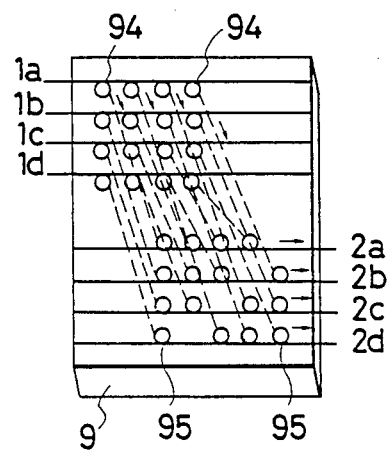
Figure 3A:
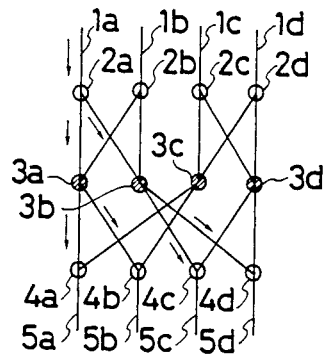
FIGS. 3A and 3B are diagrams showing an optical matrix switch proposed in a prior Japanese Patent Application filed by the assignee of the present application.
Figure 3B:
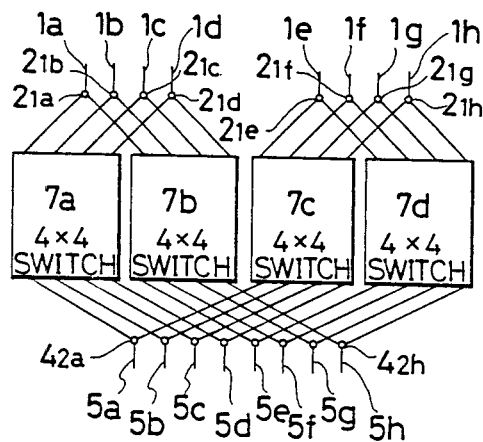
Figure 3C:
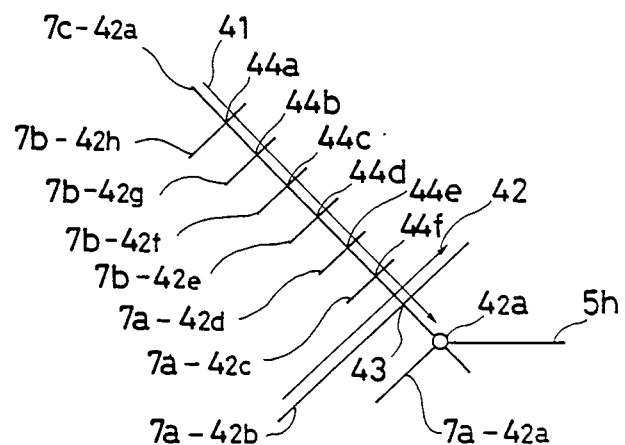
FIG. 3C illustrates a problem associated with an optical matrix switch shown in FIGS. 3A and 3B.

The light signal entering 3b from the optical switch 2a has already passed through one point of intersection in FIG. 3A, so if (as in FIG. 3A) there is no dummy waveguide 11b, the strength of this light signal will differ from that of the light signal entering 3b from the optical switch 2b. This invention thus provides the same effect as at point of intersection. The paths by which light can enter the two input ports of one of the switches 3a, 3b, 3c, or 8d are always adjacent, so if there are no dummy waveguides, one path will always have an excess of $\log_2 n - 1$ points of intersection.

Figure 7A:
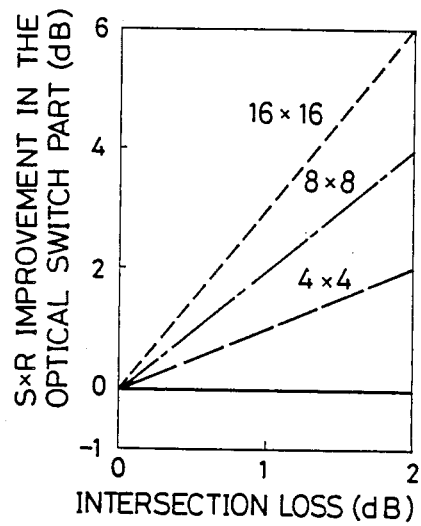
FIG. 7 and FIG. 8 are graphs showing the S×R improvement and worst-case S×R, respectively.
Figure 7B:
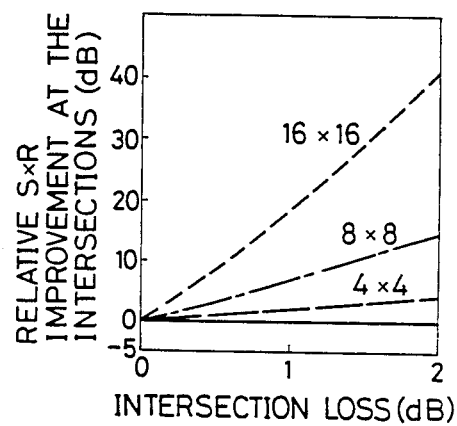

FIG. 7A shows the degree of improvement in the crosstalk/signal strength ratio in relation to the crosstalk arising at the optical switches 3a through 3d. FIG. 7B shows the degree of improvement in the crosstalk/signal strength ratio in relation to the crosstalk arising at the points of intersection in the worst case.

Figure 8:
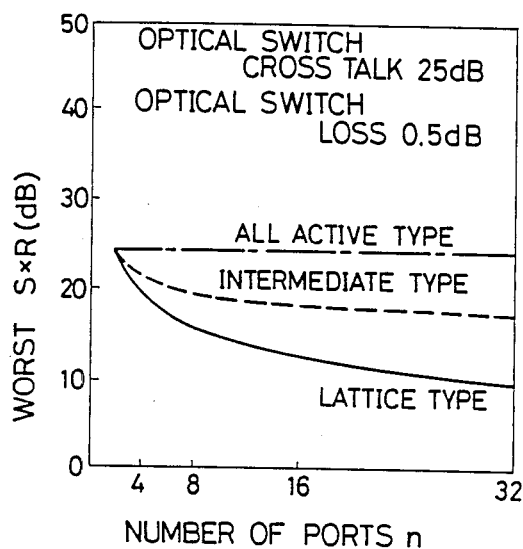

FIG. 8 shows the worst case of the S×R value after the improvement made by this invention. Both the all-active and intermediate types show improvement in characteristics over the elementary square matrix.

Figure 9:
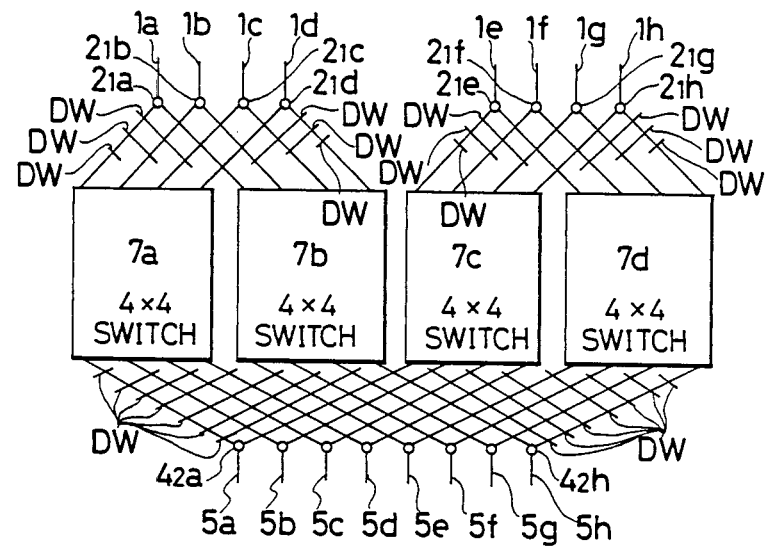
FIG. 9 is a schematic diagram of another embodiment of this invention.

An 8×8 optical matrix switch embodiment will be described next. FIG. 9 is a schematic diagram of this embodiment, corresponding to the i=2 case in FIG. 4. The difference between this embodiment and that in FIG. 5A are that there are eight input ports 1a, 1b, ... , 1d, the input branching tree has two stages of 1×2 branching means $2_{1a}, 2_{1b}, \ldots, 2_{2a}, \ldots, 2_{2p}$. which feed thirty-two branched signals to sixteen 2×2 optical switches 3a, 3b, ..., 3p and the thirty-two switch output signals enter a two-state output merging tree consisting of the 2×1 merging means $4_{1a}, 4_{1b}, \ldots, 4_{1p}, 4_{2a}, \ldots, 4_{2h}$, the output signals of which are connected to the eight output ports 5a, 5b, ..., 5h.

The configuration in FIG. 9 can be viewed as consisting of four unit matrices 7a, 7b, 7c, and 7d, each equivalent in configuration to the 4×4 optical matrix switch of FIG. 5A. The four units are arranged in parallel, and the input ports 1a, 1b, ..., 1h are divided into two groups of four ports each, 1a to 1d and 1e to 1h, the inputs from which are distributed to the four unit matrices 7 by the first stage of 1×2 branching means $2_{1a}, 2_{1b}, \ldots, 2_{1h}$.

Figure 10:
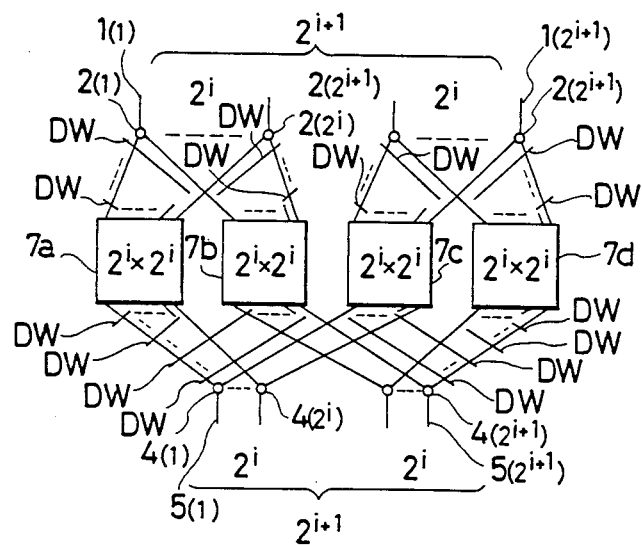
FIG. 10 is a schematic diagram of a generalized optical matrix switch according to this invention.

FIG. 10 shows an optical matrix switch in which this unit configuration is generalized. The input signals at the $2^{i+1}$ input ports $1_{(1)}, \ldots, 1_{(2i+1)}$ are divided into two blocks of $2^i$ signals each, and the pairs of outputs from the 1×2 branching means $2_{(1)}, \ldots, 2_{(2i)}$ or $2_{(2i+1)}, \ldots, 2_{(2i+1)}$ are supplied to a pair of different unit matrices: either to 7a and 7b, or to 7c and 7d. The outputs from the unit matrices are combined by the 2×1 merging means $4_{(1)}, \ldots, 4_{(2i)}$ of $4_{(2i+1)}, \ldots 4_{(2i+1)}$, resulting in output signals at the $2^{i+1}$ output ports 5(1), ..., $5(2^{i+1})$.

Each of the $2^i \times 2^i$ unit matrices from 7a to 7d has the structure shown in FIG. 10 with i replaced by i-1. When successive replacements reach i=1, the unit matrix is the 2×2 optical switch shown in FIG. 5B.

The 4×4 optical matrix switch in FIG. 8A can also be viewed as an instance of the generalized configuration in FIG. 10, in which the unit matrices are 2×2 optical switches.

The inventive concept of providing dummy waveguides to equalize the total number of points of intersection can be applied to various other structures of optical matrix switches.

In the following description of further embodiments and modifications illustration of the dummy waveguides are omitted.

Figure 11:
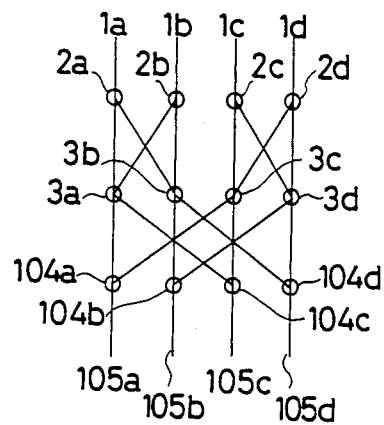
FIGS. 11 and 12 illustrate two examples of 4×4 optical matrix switches.

FIG. 11 shows another example of a 4×4 optical matrix switch.

The circuit configuration in FIG. 11 has a function similar to that of the circuit shown in FIG. 5A. The output merging means 104a, 104b, 104c, and 104d in FIG. 11 correspond to 4a, 4c, 4b, and 4d in that order in FIG. 5A, while the output ports 105a, 105b, 105c, and 105d correspond to the output ports 5a, 5c, 5b, and 5d.

Figure 12:
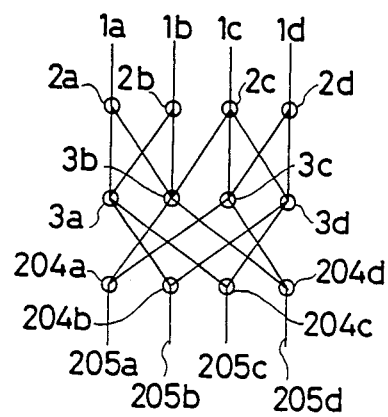

FIG. 12 shows a further example of a 4×4 optical matrix switch. In this example, output merging means 204a, and 204d positioned outside of the array of merging means 204a to 204d are connected to 2×2 switches 3b and 3c positioned inside of the array of four switches 3a to 3d, and output merging means 204b and 204c positioned inside are connected to the 2×2 switches 3a and 3d positioned outside.

The arrangement of FIG. 12 has a particular advantage in that all the four inputs are transmitted to different outputs then the all the 2×2 switches are in the same state, i.e.. either in the cross state in which the light propagates straightly or in the bar state in which the light is totally reflected, in other words, when the same control signal is applied to the control electrodes of all the 2×2 switches.

In the preceding embodiments it is also possible to configure the 1×2 branching means from 1×2 optical switches and the 2×1 merging means from 2×1 optical switches, or to configure only the 1×2 branching means from 1×2 optical switches.

Figure 13:
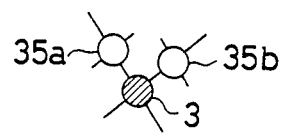
FIG. 13 illustrates an optical matrix switch constructed from two on/off switches.

In particular, when the branching means are passive branching means, the optical matrix switch can be constructed by providing on/off switches 35a and 35b at the two inputs of the 2×2 optical switch 3, as in FIG. 13. If both the input branching tree and output merging tree are configured from passive branching and merging means, the optical matrix switch has a compact overall structure, with the length of just two optical switch stages. The saving in space is particularly noticeable when there are eight or more input ports.

In FIGS. 5A, 9, 10, 11, and 12 it is also possible to reverse the matrix by switching the input and output ports.

Figure 14A:
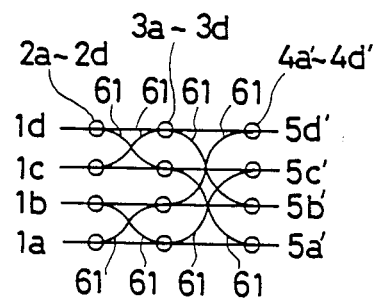
FIG. 14 A to 14C illustrate a further embodiment of this invention.
Figure 14B:
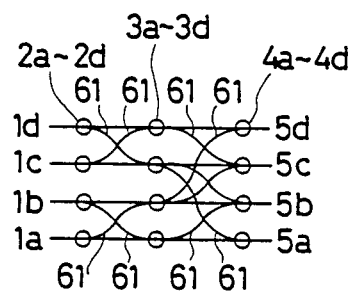
Figure 14C:
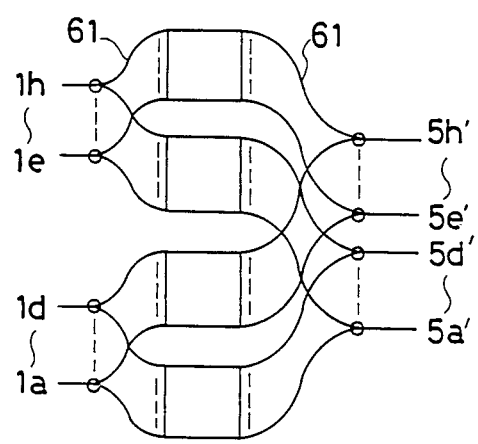

FIG. 14A to FIG. 14C show other embodiments of this invention. The waveguide interconnections in these embodiments are identical to those in FIG. 11, FIG. 5A, and FIG. 9, except that some of the waveguides connecting the optical switches, branching means, and merging means are bent. If we refer to the direction of the straight lines connecting corresponding members of the equal numbers of input and output ports as the longitudinal direction and the direction perpendicular to this direction as the transverse direction, then some or all of the waveguides 81 connecting optical switches, branching means and merging means that are positioned differently in the transverse direction follow bet paths. The bent paths take the form of piecewise circular arcs as illustrated in the drawing. Use of bent waveguides enables the longitudinal dimensions of the optical matrix switch to be shortened.

Figure 15A:
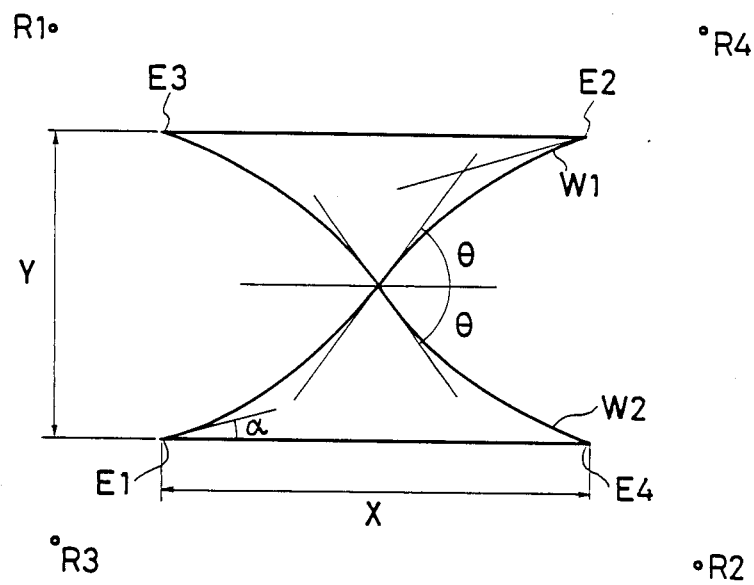
FIG. 15A and 15B and FIG. 16 illustrate the change in dimensions when bent waveguides are used.
Figure 15B:
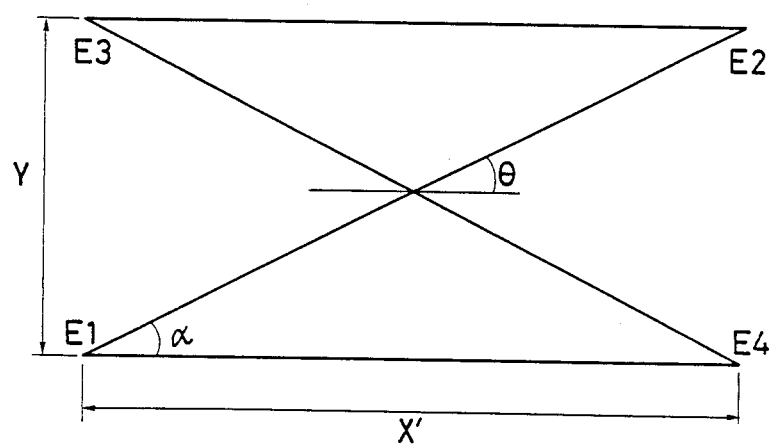

This shortening effect will be explained with reference to FIGS. 15A and 15B, which show two intersecting bent waveguides W1 and W2. The bent portions are combinations of circular arcs with centers at R1 to R4.

Suppose the optical switches, branching means, merging means, and other elements E1 to E4 are aligned in the longitudinal and transverse directions and separated by distances of Y in the transverse direction. Let the distance between elements in the longitudinal direction be X when bent waveguides are used and X' when straight waveguides are used. The dimensions X and X' are limited by the angle of divergence $2\alpha$ at the points of branching and the angle of intersection $2\alpha$ at the point of intersection. The angle of divergence $2\alpha$ must normally be less than about 2 degrees, and cannot be made larger than 4 degrees even by the use of special materials. To avoid crosstalk the angle of intersection $2\theta$ must be at least 4 to 7 degrees.

If the angle of divergence $2\alpha$ is the same in the case of straight and bent waveguides, in comparison with the straight waveguides, the bent waveguides permit the angle of intersection $2\theta$ to be larger and the distance X between elements to be shorter. With straight waveguides, the angle of intersection and the angle of divergence are equal, so special optical switches are required to achieve the necessary angle of intersection (4 to 7 degrees); but with bent waveguides the angle of divergence can be less than the angle of intersection, so special optical switches are not needed.

Figure 16:
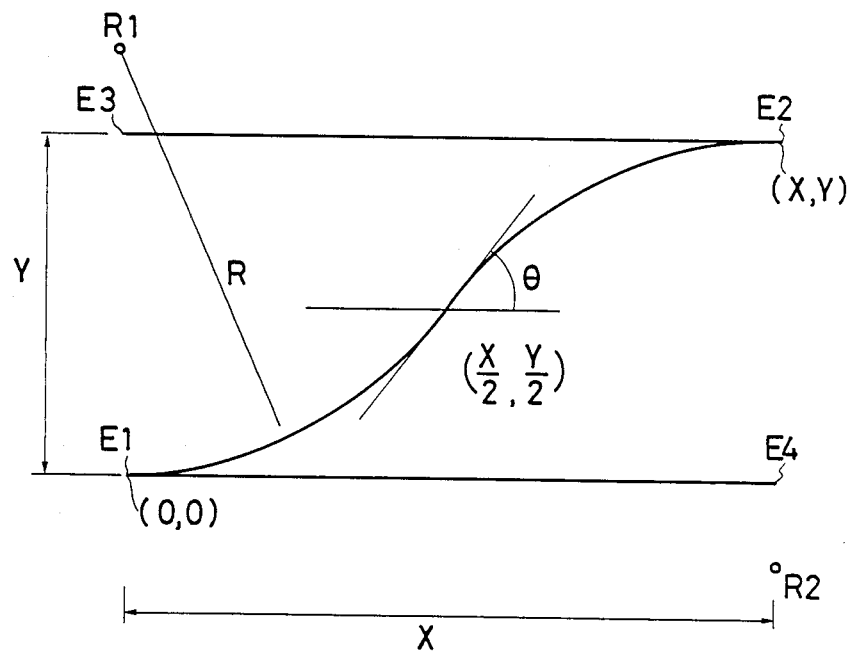

The greater the distance Y between the connected elements is, the greater is the effects of using bent waveguides. This will be explained with reference to FIG. 16. For simplicity, the angle of divergence $2\alpha$ is assumed to be 0. $2\theta$, X, and Y have the same meaning as in FIG. 18, and R is the radius of curvature of the waveguide.

If the origin of the x-y coordinate system is the branching point E1, the equation of the circle is:

$$(X/2)^2 + [(Y/2) - R]^2 = R^2 \quad (1)$$

Hence;

$$X = 2(YR - Y^2/4)^{\frac{1}{2}} \quad (2)$$

If Y is sufficiently small in comparison to R, then as equation (3) indicates, $$X = (4YR)^{\frac{1}{2}} \quad (3)$$

as Y increases, X increases in proportion only to the square root of Y. With straight waveguides, X and Y increase in direct proportion. Accordingly, the greater the separation in the Y direction between the two elements to be connected, the greater is the effects (comparative reduction in X) of using a bent waveguide. As the number of ports increases, it becomes necessary to connect elements at increasingly great separations in the transverse direction, so increasingly large values of Y are present. The effect of using bent waveguides can therefore be considered to increase with increasing numbers of ports.

Figure 17A:
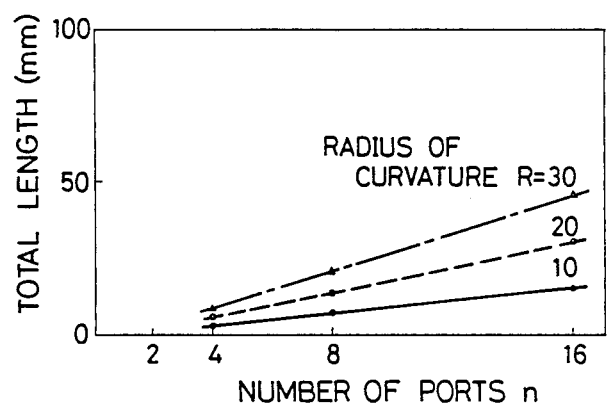
FIGS. 17A to 17C and FIGS. 18A to 18B are graphs illustrating the results of preliminary calculations of the total length of the optical matrix switch.
Figure 17B:
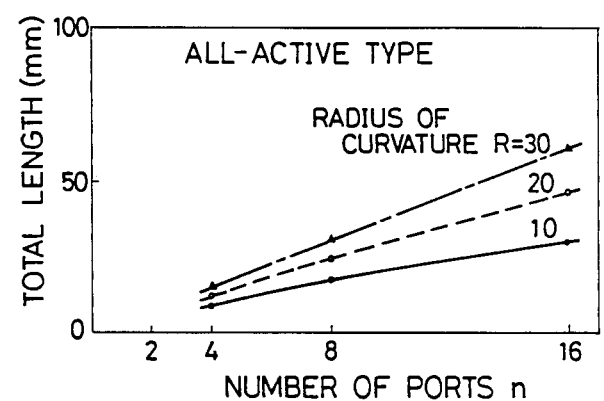
Figure 17C:
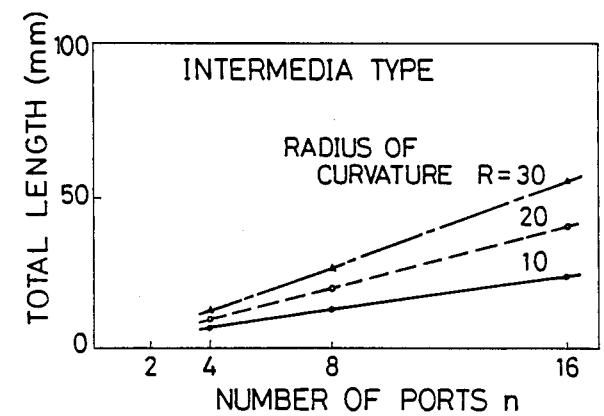

FIGS. 17B, 17C, 18A and 18B show the results of preliminary calculations of the total lengths of various optical matrix switches. FIG. 17A is plotted with respect to the number of ports. FIG. 17A treats the case in which the branching means and merging means are configured from passive means without& using optical switches (so ls, the length of the switches, is 0). FIG. 17B shows the all-active case in which the branching means and merging means are configured entirely from optical switches (so ls=2). FIG. 17C shows the intermediate case in which either the branching means are configured entirely from optical switches (ls=2) and the merging means are configured entirely from passive elements ( s=0), or vice versa. Values are plotted for three radii of curvature R: 10 mm, 20 mm, and 30 mm. In FIG. 17A, the distance Yu between elements of the 2×2 optical switches in the Y direction and the distance Xu in the X direction for R=10 mm, 20 mm, and 30 mm are as follows:

R=10 mm: Yu=0.04 mm; Xu=1.2 mm
R=20 mm: Yu=0.04 mm; Xu=2.4 mm
R=30 mm: Yu=0.112 mm; Xu=3.6 mm

The angle of intersection $2\theta$ is assumed to be 7 degrees.

Figure 18A:
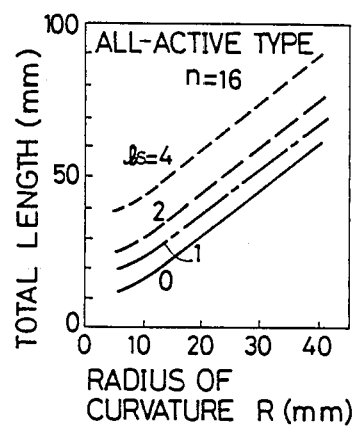
Figure 18B:
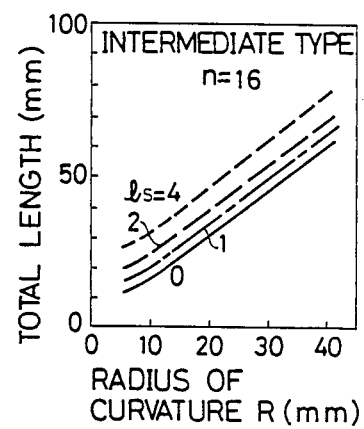

FIGS. 18A and 18B the total length of a 16×16 optical matrix switch a function of the radius of curvature. FIG. 18A is for the all-active case: FIG. 18B is for the intermediate case.

In accordance with the invention, dummy waveguides DW are provided, forming dummy points of intersection so that the number of points of intersection passed through is the same for light following any path.

In the embodiments above it is possible to configure the 1×2 branching means using 1×2 optical switches and the 2×1 merging means using 2×1 optical switches, or to configure only the 1×2 branching means using 1×2 optical switches.

It is also possible to apply this invention to an optical matrix switch in which at least some of the waveguides connecting the optical switches, branching means, and merging means are bent.

In this invention as described above, input signals from input ports enter an input branching tree consisting of 1×2 branching means, switch output signals are obtained from the 2×2 optical switches of a double tree that is connected to the input branching tree, these enter an output merging tree consisting of 2×1 merging means, and output signals are obtained at the output ports. The number of optical switch states that information entering at the input ports must pass through can be $2\log_2 2^{i+1} - 1$, so light loss is reduced. Furthermore, without increasing crosstalk, this invention enables the optical matrix switch to be constructed with only $3(i+1)^2/4$ optical switches as compared with the normal tree structure, and permits an optical matrix switch to be configured with about 5/4 as many optical switches as compared with the elementary square matrix array, so it is capable of providing a compact optical matrix switch with excellent selection capabilities and little crosstalk.

In addition, dummy points of intersection are formed with dummy waveguides to equalize the total number of points of intersection on any light propagation path, so the light obtained at the output ports is nearly uniform.

If bent waveguides are used, the length of the optical matrix can be still further reduced.

What is claimed is:

1. An optical matrix switch with $2^{i+1}$ input ports (where i is a natural number) and $2^{i+1}$ output ports, that performs a matrix selection on optical input signals received at the input ports and outputs them as optical output signals at the output ports comprising:
an i-state input branching tree consisting of $1\times 2$ branching means connected in a tree configuration, for dividing the optical input signals into $2^{(2i+1)}$ branched signals;
a double tree including $2^{2i}$ $2\times 2$ optical switches connected in series to the input branching tree so that each $2\times 2$ optical switch receives two branched signals from different input ports and generates switch output signals at a selected one of its two outputs;
an i-stage output merging tree consisting of $2\times 1$ merging means connected in a tree configuration for receiving the switch output signals from the $2\times 2$ optical switches and generating optical output signals at the $2^{i+1}$ output ports; and
means providing dummy points of intersection to equalize the number of points of intersection on any light propagation path from an input port to an output port.

2. An optical matrix switch according to claim 1, wherein said branching means, said $2\times 2$ optical switches and said merging means are interconnected by waveguides which are formed on a substrate.

3. An optical matrix switch according to claim 2, wherein said waveguides include bent portions, whereby the length of the optical matrix switch from said input ports to said out ports are shortened.

4. An optical matrix switch according to claim 1, wherein an array of four $2\times 2$ optical switches adjacent to each other, an array of four branching means connected to said pair of $2\times 2$ optical means and an array of four merging means connected to said pair of $2\times 2$ optical means form a $4\times 4$ optical switch.

5. An optical matrix switch according to claim 4, wherein then the $2\times 2$ optical means, the branching means and the merging means are numbered consecutively according 6. An optical matrix switch according to claim 1, wherein the $2\times 2$ optical means are arranged in a lateral direction orthogonal to the direction of length that is the direction from the input ports to the output ports. to their positions in the lateral direction, the first, second, third and fourth branching means or merging means are respectively connected to first and second $2\times 2$ optical means, first and second $2\times 2$ optical means, third and fourth $2\times 2$ optical means and third and fourth $2\times 2$ optical means, and the first, second, third and fourth merging means or branching means are respectively connected to second and third $2\times 2$ optical means, first and fourth $2\times 2$ optical means, first and fourth $2\times 2$ optical means and second and third $2\times 2$ optical means.

* * * * *

UNITED STATES PATENT AND TRADEMARK OFFICE
CERTIFICATE OF CORRECTION

PATENT NO. : 4,852,958

DATED : August 1, 1989

INVENTOR(S) : Hideaki Okuyama; Shigehiro Kusumoto; Keisuke Watanabe and Kiyoshi Nagai It is certified that error appears in the above-identified patent and that said Letters Patent is hereby corrected as shown below:

On the title page, in the heading, line below section 19:

change "Okuyama" to --Okayama--;

section 75, line 1: change "Okuyama" to --Okayama--.

Signed and Sealed this

Twenty-fourth Day of July, 1990

*Attest:*

HARRY F. MANBECK, JR.

*Attesting Officer*       *Commissioner of Patents and Trademarks*